UNITED STATES PATENT OFFICE.

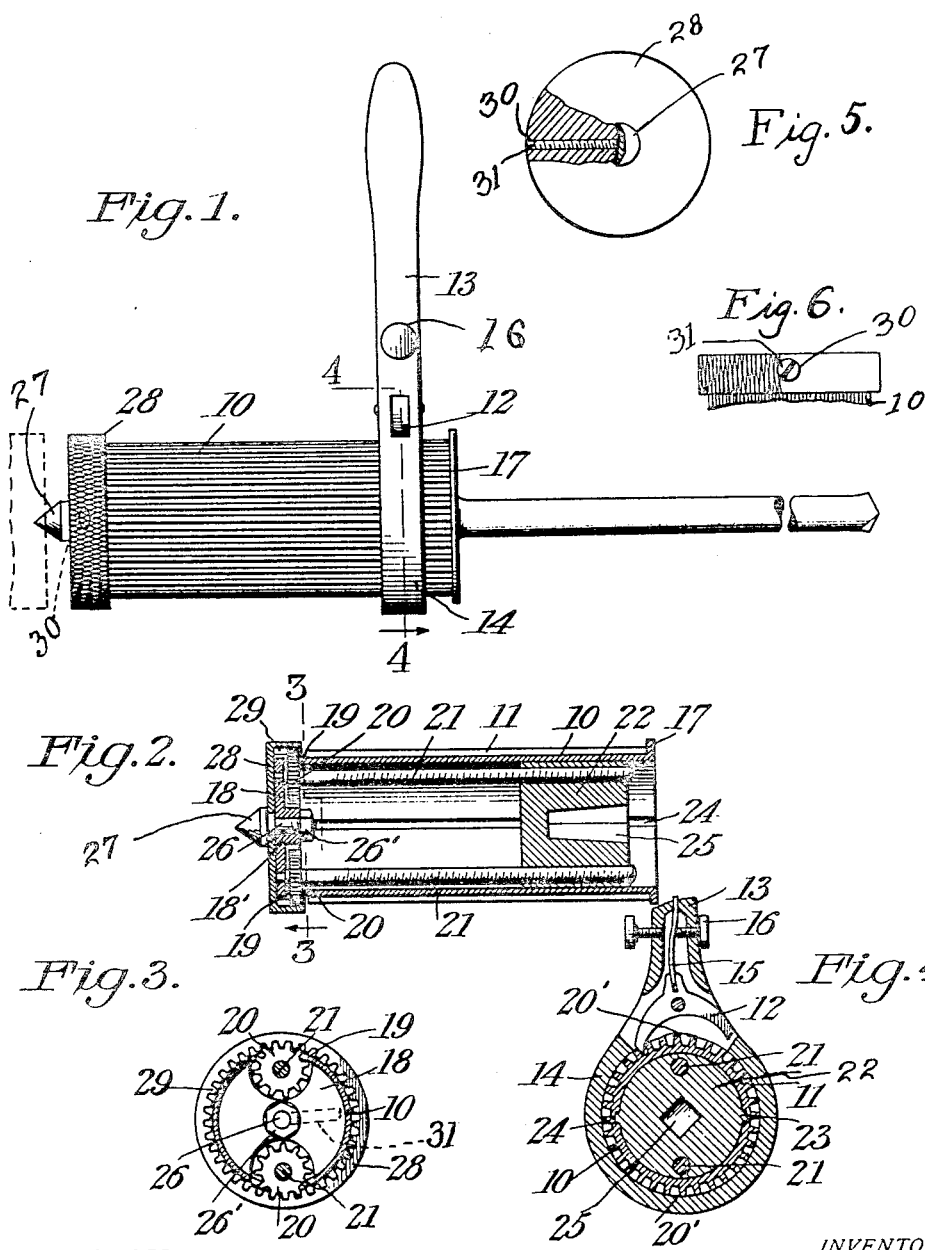

EUGENE C. McMILLAN, OF LAREDO, TEXAS, ASSIGNOR OF ONE-THIRD TO ALBERT MARTIN, OF LAREDO, TEXAS.

RATCHET-DRILL.

1,069,714.

Specification of Letters Patent.

Patented Aug. 12, 1913.

Application filed April 3, 1912. Serial No. 688,274.

*To all whom it may concern:*

Be it known that I, EUGENE C. MCMILLAN, a citizen of the United States, residing at Laredo, in the county of Webb and State of Texas, have invented new and useful Improvements in Ratchet-Drills, of which the following is a specification.

This invention relates to mechanism for operating drills, wrenches or the like, by ratchet action, and has for an object to provide efficient means for adjusting the device to operate in confined situations, adjustable to bear against surfaces over the work at various distances, and having also an efficient feeding mechanism for drills operating in a positive way and adapted to be controlled with facility.

An important object is to make the device easily taken apart and adapted to be stored in a small space.

A valuable attainment of the invention is to make possible the use of an extremely long drill bit, the rotating head being adapted to accommodate a large part of the bit shank therewithin.

The device is especially adapted to operate in a chamber or casing having a reduced access opening, the head being elongated to bear against surfaces spaced laterally from the opening and the operating lever being so engaged therewith as to operate at any point in the length of the head.

Other objects and advantages will be apparent from the following description and from the drawings, in which—

Figure 1 is a side view of the device, Fig. 2 is a longitudinal sectional view thereof, Fig. 3 is a cross section thereof on line 3—3 of Fig. 2, Fig. 4 is a section taken on line 4—4 of Fig. 1, Figs. 5 and 6 are details of modified means for securing the center bolt.

There is illustrated a cylindrical fluted rotating head 10, the fluting or toothing 11 of which is adapted to be engaged on either side by a dog 12 carried by a handle 13, having a collar portion 14 engaged slidably and revolubly upon the cylinder. The dog has oppositely extending arms, each adapted to engage the fluting 11 for rotation of the head in respective directions, a suitable spring 15 being carried by the handle in engagement with the dog and means being provided at 16 for adjustment thereof to bear either arm of the dog upon the head 10 alternatively.

The head is provided at its lower end with a flange or other suitable peripheral projection 17, whereby the movement of the collar 14 is limited in that direction. At its upper end the cylinder is closed by a head 18 integral therewith or suitably secured if separate, having circular recesses 19 formed in its under side on axes parallel to the axis of the cylinder and being of such size as to open laterally through the cylinder, two gears 20, fitting snugly and revolubly in the recesses, their peripheries projecting beyond that of the cylinder. Stepped in the gears axially there are screw threaded shafts 21 arranged to be rotated by the gears and to bear thereagainst, these being engaged in correspondingly threaded openings at opposite sides of a carriage block 22, slidable within the cylinder and having guide lugs 23 engaged in suitable grooves 24 in the cylinder. This carriage block may, if desired, be equipped with some suitable form of bit gripping device, but as shown, is provided with simply a suitable angular socket 25, adapted to receive the shank terminals of bits snugly, which will serve readily for ordinary use.

The head 18 is provided with a central threaded aperture 18′ which receives a threaded tenon of the retaining bolt 26, the head 27 of which is conical and thus adapted to serve as a center bearing for the anchorage of the device. Held revolubly under this head there is a circular apertured plate 28 forming part of an internal gear 29, projecting laterally therefrom closely around the cylinder 10, its teeth being meshed with the gears 20. The plate 28 fits loosely around the bolt 26, so as to rotate relatively to the cylinder. If desired, the tenon of the bolt 26 may be extended through the head 18 and a suitable nut 26′ threaded upon the bolt to hold it against rotation.

It will be observed that the threads on the shaft 21 are left-hand ones, so that when the device is in use for the boring of a hole with a clockwise motion, as is ordinarily done, or for the driving of a screw, if the gear 29 is checked against rotation with the cylinder, the carriage block will be moved outwardly toward the work, thereby maintaining the bit in proper engagement. In the event that a bolt or screw is being withdrawn, and the cylinder is rotated in a counter-clockwise direction, checking of the rotation of the gear will allow the bit to move outward with the work. This method of feeding is particularly advantageous in confined situations, where a workman might not be able to get his hand into such position as to operate the feeding mechanism properly.

An important advantage of the construction presented lies in the fact that the gear 29 serves as a retainer for the collar 14 of the handle, this collar being provided with opposed arcuate notches 20' to allow passage of the projecting gear portion, so that by removal of the bolt 26 and the gear the handle may be quickly slipped off of the cylinder and the two elements packed side by side in a tool kit or for shipment. Also, this allows the use of different forms of handles, and it will be understood that a curved or other shaped handle may be employed, as well as any desired construction of carriage device equivalent in function to the block 22.

It will be readily understood that the length of the drill may be made in any measurement desirable, which it has been found in practice may range from 2 and ½ inches, or even less, to a maximum limited only by the strength of the material used in the tool.

It will be understood that any suitable means may be used for holding the bolt 26 against rotation in the head 18, in place of the nut 26', one method being indicated at 30 and 31 in Figs. 5 and 6 respectively, 30 being an aperture through the flange of the rotating plate 28 adapted to be positioned over the outer end of a set screw 31 engaged through a suitable threaded opening in the head 18 arranged to bear against the bolt 26 which may be threaded in the head itself.

What is claimed is:

1. In a device of the class described, a cylinder and means for rotating the same, a bit carriage element longitudinally slidable therein, threaded shafts engaged with the carriage element for reciprocation thereof upon rotation of the shafts, gears secured upon the shafts adjacent one end of the cylinder, having peripheral portions projecting beyond the periphery of the cylinder and an internal gear member carried by the cylinder in mesh with the projecting portions of the gears first named.

2. In a device of the class described, an exteriorly fluted cylinder, an operating handle having a circumscribing collar portion slidable and revoluble thereon, said cylinder having a fixed device at one end for retaining said collar thereon, a bit carriage element longitudinally reciprocable in the cylinder, revoluble threaded shafts carried by the cylinder and in engagement with the carriage member for reciprocation of the carriage element upon rotation of the shafts, gears secured upon shafts adjacent one end of the cylinder and projecting beyond the periphery thereof, said cylinder having a head portion outwardly of the gears, a circular plate outwardly of the head, a retaining bolt engaged revolubly therethrough and detachably secured to the head for retention of the plate revolubly, and an internal gear portion carried at the periphery of the plate projecting inwardly of the adjacent cylinder end for retention of said collar, and being meshed with said first named gears for operation of the carriage when rotated relatively to the cylinder.

3. In a ratchet drive for drills and the like, a fluted rotating head, an operating handle having a collar circumscribing the head, a pawl on the handle engaging the head and slidable longitudinally thereon, a retaining projection carried by the head on one side of the collar to check the collar against sliding movement in one direction, a bit carrier longitudinally movable in the head, a feeding mechanism carried by the head for moving the bit relatively therein, and means spaced from the said retaining projection to check the collar against sliding movement in the other direction.

In testimony whereof I have hereunto set my hand in presence of two subscribing witnesses.

EUGENE C. McMILLAN.

Witnesses:
 LEONARD G. VIDAURRI,
 TOM ATLEE.

---

Copies of this patent may be obtained for five cents each, by addressing the "Commissioner of Patents, Washington, D C."